US009363475B2

(12) United States Patent
Bodilis et al.

(10) Patent No.: US 9,363,475 B2
(45) Date of Patent: Jun. 7, 2016

(54) DEVICE AND METHOD FOR THE DISTRIBUTED MIXING OF DATA STREAMS

(75) Inventors: Pierre Bodilis, Paris (FR); Florent Previtali, Pontault-combault (FR)

(73) Assignee: Streamwide, Paris (FR)

(*) Notice: Subject to any disclaimer, the term of this patent is extended or adjusted under 35 U.S.C. 154(b) by 165 days.

(21) Appl. No.: 14/004,031

(22) PCT Filed: Mar. 8, 2012

(86) PCT No.: PCT/FR2012/050491
§ 371 (c)(1),
(2), (4) Date: Sep. 9, 2013

(87) PCT Pub. No.: WO2012/120240
PCT Pub. Date: Sep. 13, 2012

(65) Prior Publication Data
US 2013/0342639 A1    Dec. 26, 2013

(30) Foreign Application Priority Data
Mar. 10, 2011 (FR) ...................................... 11 51986

(51) Int. Cl.
*H04N 7/14* (2006.01)
*H04N 7/15* (2006.01)

(52) U.S. Cl.
CPC . *H04N 7/15* (2013.01); *H04N 7/152* (2013.01)

(58) Field of Classification Search
USPC .......................... 348/14.11; 370/260; 709/204
See application file for complete search history.

(56) References Cited

U.S. PATENT DOCUMENTS 6,212,547 B1    4/2001    Ludwig et al.

FOREIGN PATENT DOCUMENTS

EP    2285106    2/2011

OTHER PUBLICATIONS

International Search Report dated Jun. 20, 2012 for Application No. PCT/FR2012/050491, with English Translation.
Written Opinion dated Jun. 20, 2013 for Application No. PCT/FR2012/050491, with English Translation.
International Priority Report on Patentability dated Sep. 10, 2013 for Application No. PCT/FR2012/050491, with English Translation.

*Primary Examiner* — Creighton Smith
(74) *Attorney, Agent, or Firm* — Frost Brown Todd LLC (57) ABSTRACT

The invention relates to a device for the distributed mixing of data streams, including a main multimedia server (10) capable of receiving at least one incoming data stream (A, B, C) and of outputting at least one outgoing data stream (A', B', C'), and at least one secondary multimedia server (20) capable of receiving at least one incoming data stream (D, E, F) and of outputting at least one outgoing data stream (D', E', F'), the main multimedia server including a selection module (11) arranged so as to select a plurality of data streams (A, B, E, F) from the incoming data streams and a global mixing module (13) arranged so as to mix the selected data streams in order to obtain an aggregated stream (S), and the secondary multimedia server including a local mixing module (21) arranged so as to mix at least two incoming data streams (E, F) received by the secondary multimedia server and selected by the selection module of the main multimedia server in order to obtain an incoming intermediate stream (T) capable of being used by the global mixing module of the main multimedia server to obtain the aggregated stream. The invention also relates to a corresponding distributed mixing method.

19 Claims, 4 Drawing Sheets

DEVICE AND METHOD FOR THE DISTRIBUTED MIXING OF DATA STREAMS

The invention relates to the field of transmitting and mixing streams of data, particularly streams of multimedia audio and video data in a context of audio and/or video teleconferences.

Advances in recent years in information technology combined with the need to optimize work time and limit travel have encouraged the recent growth in teleconferencing systems.

Conventional teleconferencing systems are based on the transmission of data streams between the various teleconference participants, with audio streams for sound and video streams for images.

In order to best manage this type of teleconference, the various streams in question are managed by a multimedia conferencing server which takes care of organizing the videoconference for the persons involved. This server receives the various data streams coming from the videoconference participants, and processes these various streams by mixing them to construct output data streams to be sent back to the various participants.

In the case of video data, a central multimedia videoconferencing server can receive a certain number of video streams from different participants, and can broadcast to them a single video stream in which these streams are mixed, for example as a video mosaic.

In order to process the different input and output streams, this multimedia conferencing server has mixing means of limited computational power, which prevents it from managing videoconferences where the number of participants exceeds the capacity allowed by these processing means. These multimedia conferencing servers are therefore not currently scalable.

Current multimedia conferencing servers also require all participants to be handled by the same server, which is difficult to manage when a conferencing service is distributed across multiple machines (farm, cloud, etc.).

A need therefore exists for a data stream mixing system which is scalable and has computational capacities exceeding those of current multimedia servers. The object of the invention is to overcome the above disadvantages.

To this effect, the invention proposes a device for the distributed mixing of data streams, comprising a main multimedia server able to receive at least one incoming data stream and to output at least one outgoing data stream, and at least one secondary multimedia server able to receive at least one incoming data stream and to output at least one outgoing data stream, the main multimedia server comprising a selection module arranged to select a plurality of data streams from among the incoming data streams and a global mixing module arranged to mix the selected data streams in order to obtain an aggregated stream, the secondary multimedia server comprising a local mixing module arranged to mix at least two incoming data streams received by the secondary multimedia server and selected by the selection module of the main multimedia server in order to obtain an incoming intermediate stream usable by the global mixing module of the main multimedia server to obtain the aggregated stream.

In one embodiment, the main and secondary multimedia servers each comprise a communication module, arranged to transmit, from the selection module to the secondary multimedia server, a message indicating which incoming data streams received by the secondary multimedia server have been selected by the selection module, and to transmit the incoming intermediate stream from the local mixing module of the secondary multimedia server to the global mixing module of the main multimedia server.

In one embodiment in which the outgoing data streams comprise the aggregated stream, the communication module of the main multimedia server is arranged to transmit the aggregated stream from the global mixing module of the main multimedia server to the communication module of each secondary multimedia server.

In one embodiment, for each secondary multimedia server, the global mixing module is arranged to provide an outgoing intermediate data stream containing the aggregated stream from which the incoming intermediate data stream supplied by the secondary multimedia server is removed, the communication module of the main multimedia server is arranged to transmit the aggregated stream from the global mixing module of the main multimedia server to the communication module of the secondary multimedia server, and the local mixing module of the secondary multimedia server is arranged to obtain each outgoing data stream that is output from the secondary multimedia server by mixing the outgoing intermediate data stream with the incoming intermediate data stream.

In one embodiment in which each incoming data stream is associated with an outgoing data stream, for each outgoing data stream that is output from the secondary multimedia server, the local mixing module of the secondary multimedia server is arranged to remove from said outgoing data stream the incoming data stream associated with it.

In one embodiment, the main multimedia server additionally comprises a local mixing module arranged to mix at least two incoming data streams received by the main multimedia server once said incoming data streams are selected by the selection module, which allows even more distribution of the computational load within the system.

In one advantageous embodiment, each local mixing module is additionally arranged to decode the incoming data streams and to encode the outgoing data streams, which allows further distribution across multiple servers of the computational load related to encoding data.

The invention also proposes a method for the distributed mixing of data streams, implemented by a distributed mixing device comprising a main multimedia server and at least one secondary multimedia server, the method comprising the steps consisting of:
  receiving at least one incoming data stream in the main multimedia server and at least one incoming data stream in the secondary multimedia server;
  selecting a plurality of data streams from among the incoming data streams;
  once several incoming data streams received by the secondary multimedia server are selected, mixing said incoming data streams received by the secondary multimedia server and selected in the secondary multimedia server, in order to obtain an incoming intermediate data stream;
  mixing the selected data streams, by means of the incoming intermediate data stream, in the main multimedia server in order to obtain an aggregated stream; and
  outputting at least a first outgoing data stream from the main multimedia server and at least a second outgoing data stream from the secondary multimedia server, said outgoing data streams being obtained from the aggregated stream.

In an advantageous embodiment, this method comprises the steps consisting of, for each secondary multimedia server:

obtaining an outgoing intermediate data stream containing the aggregated stream from which the incoming intermediate data stream supplied by the secondary multimedia server is removed, sending said outgoing intermediate audio data stream from the main multimedia server to the secondary multimedia server, and obtaining each outgoing data stream that is output from the secondary multimedia server by mixing the outgoing intermediate data stream with the incoming intermediate data stream.

In one embodiment which applies in particular to the audio data stream, where each incoming data stream is associated with an outgoing data stream, for each outgoing data stream that is output from the secondary multimedia server, the incoming data stream associated with the outgoing data stream is removed from said outgoing data stream.

In one advantageous embodiment, the step of receiving incoming data streams includes the decoding of said incoming data streams, and the step of outputting outgoing data streams includes the encoding of said outgoing data streams, which allows further distribution across multiple servers of the computational load related to data encoding.

In one embodiment, the mixing device is a device for mixing video data streams and the incoming and outgoing data streams are video data streams.

In another embodiment, the mixing device is a device for mixing audio data streams and the incoming and outgoing data streams are audio data streams.

In one particular embodiment, the above selection of incoming data streams includes the selection of a predefined number of incoming data streams having the highest audio level among the set of incoming data streams, in order to ensure good sound quality during the conference.

In another particular embodiment, the above selection of incoming data streams includes the selection of a predetermined incoming data stream, in order to be able to give priority to a participant in a conference.

Other features and advantages of the invention will become apparent from the following detailed description and the accompanying drawings in which.

Figure 1:
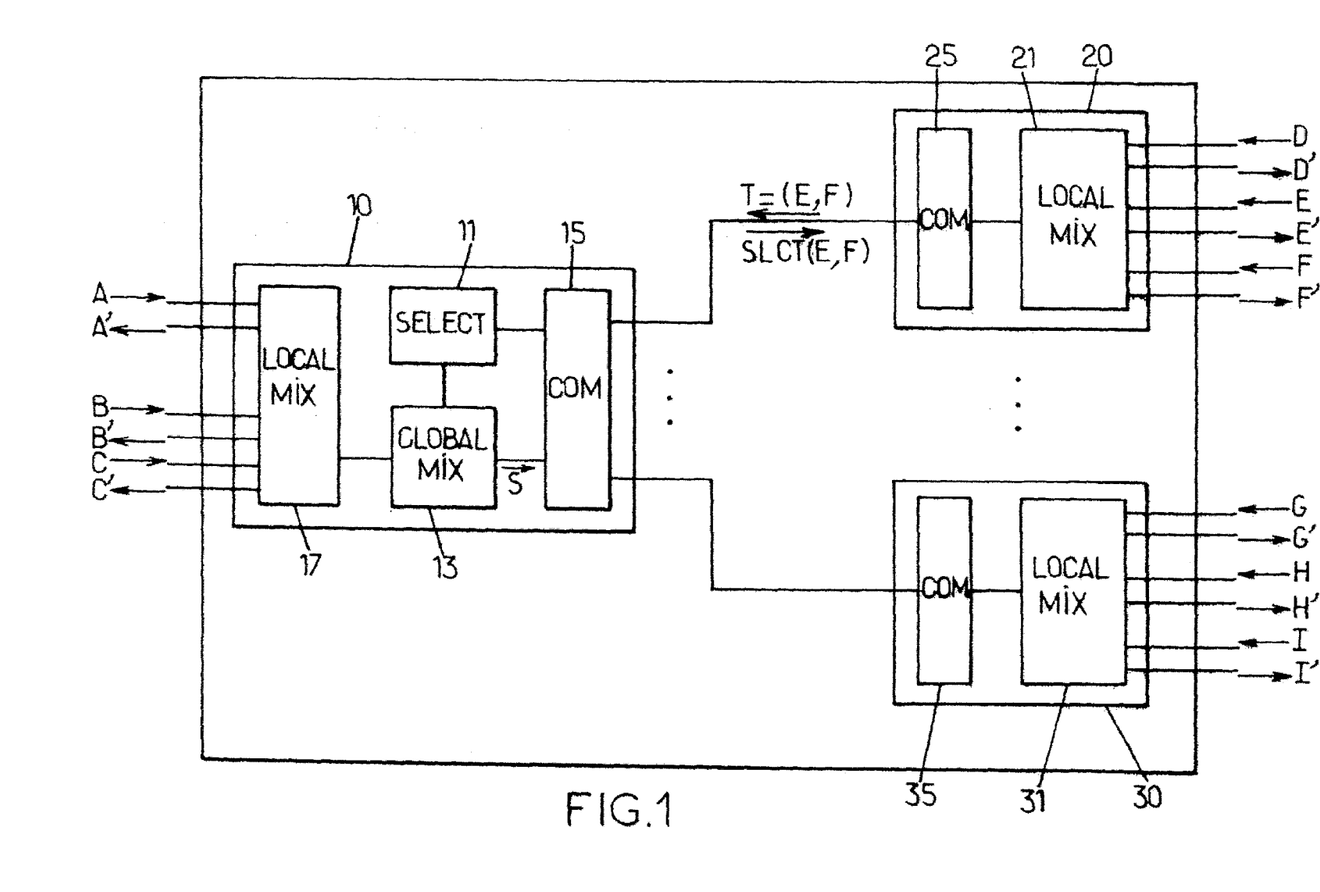
FIG. 1 schematically illustrates a device for the distributed mixing of data streams according to the invention.

We will first refer to FIG. 1, which schematically illustrates a device for the distributed mixing of data streams according to the invention.

This device for the distributed mixing of data streams comprises a main multimedia server 10 and at least one secondary multimedia server 20. Two secondary multimedia servers 20 and 30 are illustrated in FIG. 1, for purposes of illustration only, but any number of secondary multimedia servers can be employed, keeping in mind that the greater their number, the more the invention yields its advantageous effect. For reasons of brevity, only the relation between the main multimedia server 10 and the secondary multimedia server 20 is described in detail in the rest of the description.

The main multimedia server 10 is able to receive at least one incoming data stream and to output at least one outgoing data stream. Thus, in the example in FIG. 1, the main multimedia server 10 is receiving three incoming data streams A, B and C originating from three users and is sending three outgoing data streams A', B' and C' back to these three users, such that incoming data stream A is associated with outgoing data stream A', etc.

Similarly, the secondary multimedia server 20 is able to receive at least one incoming data stream and to output at least one outgoing data stream. In the example in FIG. 1, the secondary multimedia server 20 is receiving three incoming data streams D, E and F originating from three users (different from the users communicating with the main server 10) and is sending three outgoing data streams D', E' and F' back to these three users, such that incoming data stream D is associated with outgoing data stream D', etc.

Similarly, in the example in FIG. 1, the secondary multimedia server 30 is receiving three incoming data streams G, H, I originating from three other users and is sending three outgoing data streams G', H' and I' back to these three users.

The main multimedia server also comprises a selection module 11 arranged to select a plurality of data streams from among the incoming data streams. This selection module uses one or more selection criteria, which can take into account user behavior.

Thus, when the incoming data streams are audio data streams, the selection module 11 uses a selection criterion for the incoming data streams which corresponds to selecting a predefined number of incoming data streams having the highest audio level among the set of incoming data streams. In the case in FIG. 1 where six incoming data streams A-F are received, with a criterion that selects the four streams presenting the highest sound volume, the four streams A, B, E and F are selected.

An arbitrary selection criterion can also be used, for example requiring that a predetermined incoming data stream be selected, which can be useful in the case where a high priority data stream must be broadcast to the various participants.

The main multimedia server additionally comprises a global mixing module 13 arranged to mix the data streams selected by the selection module 11 in order to obtain an aggregated stream S, which is schematically represented in FIG. 1 by S=A+B+E+F. In other words, for the example in FIG. 1, the aggregated stream S therefore comprises the four data streams A, B, E and F mixed together by the global mixing module.

As for the secondary multimedia server 20, it comprises a local mixing module 21 (as does the secondary multimedia server 30 which comprises a similar local mixing module 31) arranged to mix at least two of the incoming data streams received by the secondary multimedia server, when these are selected by the selection module of the main multimedia server, in order to obtain an incoming intermediate stream T. This incoming intermediate stream T can then be sent to the main multimedia server and is usable by the global mixing module of this main multimedia server to obtain the aggregated stream S.

Thus, in FIG. 1, as the incoming data streams E and F are selected by the selection module 11, the incoming intermediate stream T is obtained by mixing these two data streams E and F (i.e. T=E+F).

One can see here that when several incoming data streams received by the secondary multimedia server are selected, a first local mixing operation can take place in the secondary multimedia server 20 (to obtain the incoming intermediate stream T) before a second mixing operation takes place in the main multimedia server 10 (to obtain the aggregated stream S). The mixing of the various selected streams is therefore distributed across the servers 10 and 20, which lightens the load on the main multimedia server compared to a situation in which it has to do all the mixing by itself.

The main multimedia server 10 additionally comprises a communication module 15, and, similarly, the multimedia servers 20 and 30 respectively comprise communication modules 25 and 35. These communication modules are connected and arranged to communicate with each other in order to exchange data streams between servers 10 and 20, and between servers 10 and 30.

In particular, these communication modules 15 and 25 can be arranged to transmit, from the secondary multimedia server 20 to the main multimedia server, parameters used for selecting incoming streams, for example such as the audio level of an incoming audio data stream, etc.

These communication modules 15 and 25 are arranged to transmit, from the selection module 10 to the secondary multimedia server 20, a message SLCT indicating which incoming data streams received by the secondary multimedia server were selected by the selection module (here streams E and F).

These communication modules 15 and 25 are also arranged to transmit the incoming intermediate stream T from the local mixing module of the secondary multimedia server to the global mixing module of the main multimedia server, so that the latter can use this intermediate stream T to construct the aggregated stream S.

In a first case, the various outgoing data streams A' to F' comprise the aggregated stream S as is, which is the particular case in the following first embodiment illustrated in FIG. 3.

In this case, the communication module 15 of the main multimedia server 10 is arranged to send the aggregated stream S from the global mixing module of the main multimedia server to the communication module of each secondary multimedia server 20, 30, etc. The secondary multimedia server can then emit outgoing streams D', E' and F' which include, or even completely correspond to, the aggregated stream S.

In a second case, the communication module 15 of the main multimedia server 10 does not return the aggregated stream S as is to the various secondary multimedia servers 20,30. This is the particular case with the following first embodiment illustrated in FIG. 4.

Figure 4:
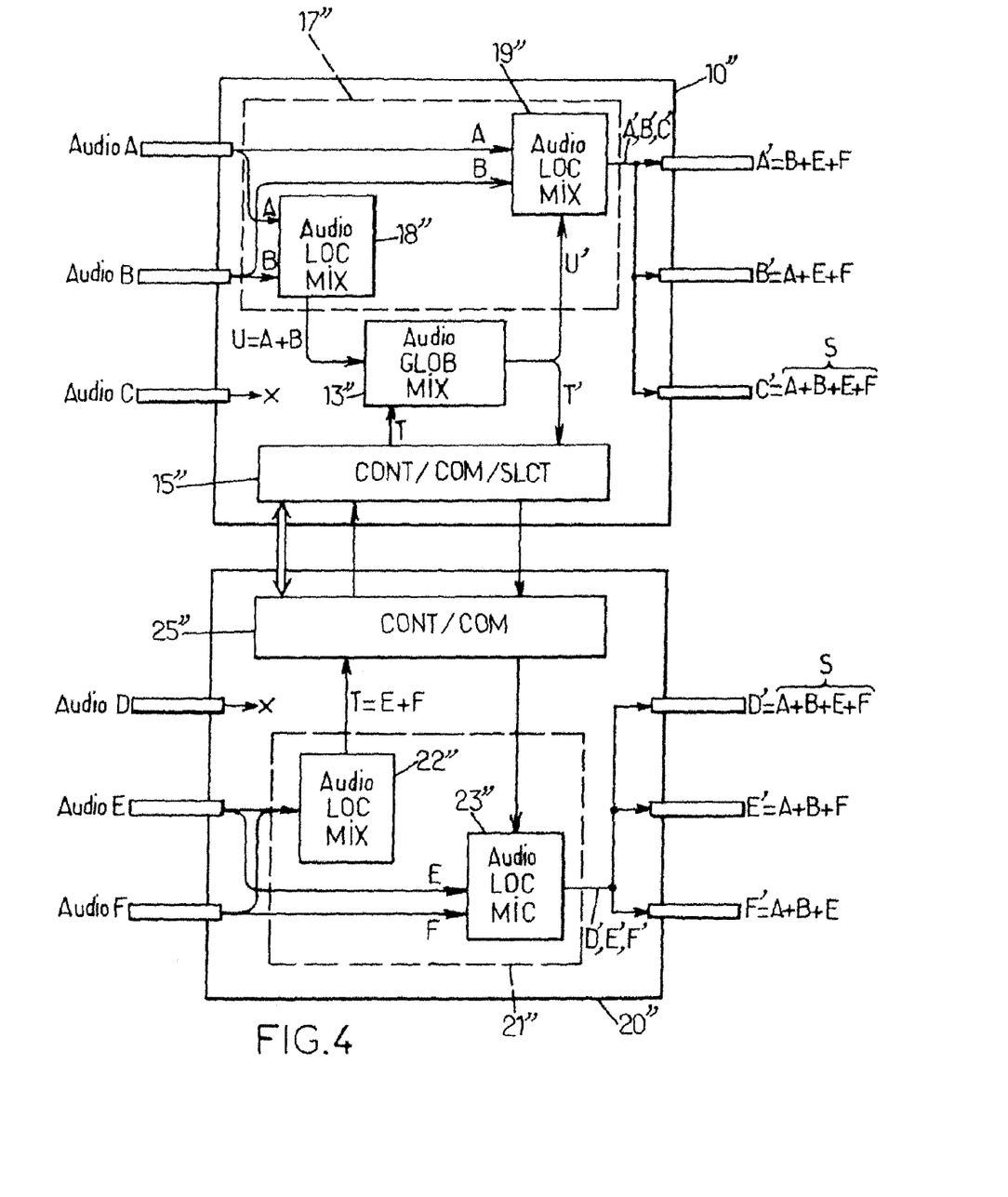
FIG. 4 illustrates a first embodiment of a device for the distributed mixing according to the invention.

In this other case, the global mixing module 13 is arranged to provide an outgoing intermediate stream T' to each secondary multimedia server. In particular, an outgoing intermediate stream is respectively constructed for each secondary multimedia server associated with the main multimedia server 10. Such an outgoing intermediate stream T' thus contains the aggregated stream S from which the incoming intermediate data stream T supplied by the secondary multimedia server concerned is removed.

"Removed" is understood here to mean that the outgoing intermediate stream T' does not include the incoming intermediate stream T, and therefore does not include the individual incoming streams E and F forming this incoming intermediate stream T.

Such removal can consist of eliminating these individual incoming streams E and F from the aggregated stream S by a digital filtering which allows all the individual streams of the aggregated signal S to pass through except these individual streams E and F. This removal operation may alternatively consist of selecting the individual streams of the aggregated stream S which are not these individual streams E and F and constructing the outgoing intermediate stream T' from the selected individual streams.

The communication module 15 of the main multimedia server 10 then sends the outgoing intermediate stream T' from the global mixing module 13 of the main multimedia server to the communication module 25 of the secondary multimedia server 20.

As for the local mixing module 21 of the secondary multimedia server, it is then arranged to obtain each outgoing data stream that is output from the secondary multimedia server (i.e. the outgoing streams D', E' and F' in FIG. 1) by mixing the outgoing intermediate stream T' with the incoming intermediate stream T as constructed by the local mixing module 21.

One can see in this latter case that, in addition to the mixing operations performed by the local mixing module 21 on the incoming streams and by the global mixing module 13 on the selected streams, a supplemental mixing operation is performed by the local mixing module 21 using the incoming and outgoing intermediate streams in order to obtain the outgoing data streams, which allows further reducing the workload on the main multimedia server.

As each incoming data stream A to F is respectively associated with an outgoing data stream A' and F', it may be advantageous to ensure that, for each outgoing data stream D' to F' that is output from the secondary multimedia server, the local mixing module 21 of the secondary multimedia server 20 is additionally arranged to remove from this outgoing data stream the incoming data stream associated with it if the latter is one of the incoming streams selected by the selection module 11.

Thus, when incoming data stream E is selected by the selection module 11, this incoming data stream E is found in all the outgoing data streams A' to F' aside from the outgoing data stream E' associated with it. Similarly, when incoming data stream F is selected by the selection module 11, this incoming data stream F is found in all the outgoing data streams A' to E', but not in the outgoing data stream F' associated with it.

This is particularly advantageous in the case of audio data streams where it is unnecessary to send a teleconference participant the sound of his or her voice.

The main multimedia server 10 may additionally comprise a local mixing module 17 arranged to mix at least two incoming data streams received by the main multimedia server when these incoming data streams are selected by the selection module 11, similarly to what is performed by the local mixing module 21 of one of the secondary multimedia servers.

The use of such a local mixing module 17 within the main multimedia server 10 allows even better distribution of the mixing of different streams across multiple mixing modules, and therefore better distribution of the computational load across the different modules 15, 17 and 21.

The incoming and outgoing data streams are presented in a specific format which allows the multimedia servers to interact with other network elements during the conference and which allows optimizing the transmission in terms of data volume and transmission error resilience. As an example, the TCP protocol can be used to convey these data streams, in order to properly manage the transmission errors which could arise.

The processing internal to the multimedia servers is not necessarily compatible with the format specifically employed for the external transmission of the data streams, and it may be appropriate to convert the incoming data streams A-F into a format appropriate for mixing once they are received by one of the multimedia servers, and conversely to convert the outgoing data streams A'-F' into a format appropriate for network transmission.

To do this, each local mixing module 17, 21, 31 is advantageously further arranged to decode the incoming data streams A-F into a format appropriate for mixing operations and to encode the outgoing data streams A'-F' into a format appropriate for data transmission.

In the case of an audio data stream, a format appropriate for the mixing operations internal to the multimedia servers can be the PCM format (for Pulse Code Modulation), and the TCP protocol can be employed for the transmission of data streams outside of the multimedia servers.

Figure 2:
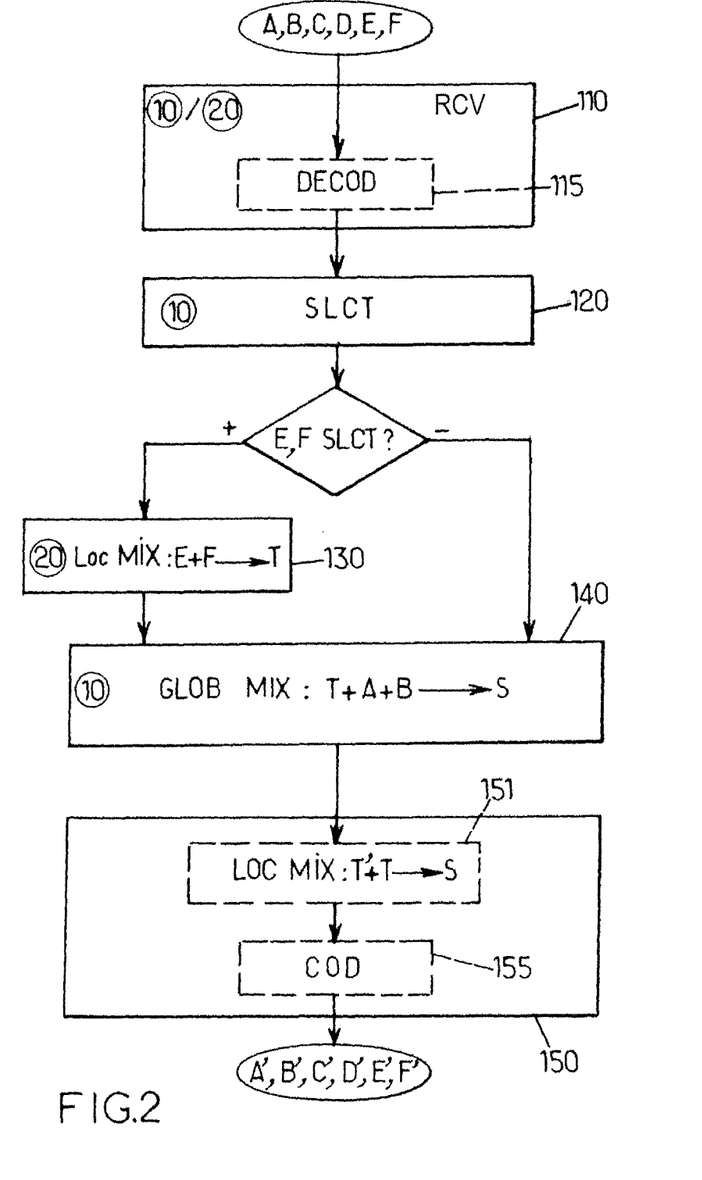
FIG. 2 illustrates the steps of a method for the distributed mixing of data streams according to the invention.

We will now refer to FIG. 2, which illustrates the steps of a method for the distributed mixing of data streams according to the invention.

This distributed mixing method 100 is implemented by a distributed mixing device as described above in relation to FIG. 1, meaning it comprises a main multimedia server 10 and at least one secondary multimedia server 20.

This method 100 comprises a step 110 of receiving at least one incoming data stream (for example three incoming data streams A, B, C) in the main multimedia server 10 and at least one incoming data stream (for example three incoming data streams D, E, F) in the secondary multimedia server.

This step 110 may advantageously comprise a sub-step 115 of decoding the incoming data streams in order to convert them from an original format, appropriate for data transmission, into a format appropriate for data stream mixing, as described above, which also allows distributing the decoding effort across multiple servers.

The method continues in a step 120 of selecting a plurality of data streams (for example the incoming data streams A, B, E, F) from among the incoming data streams received by the various multimedia servers. As mentioned above, this selection is made according to one or more selection criteria, for example selecting a certain number of streams which have the highest audio volume or selecting an arbitrary predetermined stream.

Once several incoming data streams received by the secondary multimedia server are selected (in the present example, streams E and F), the method continues in a step 130 where the local mixing module 21 of the secondary multimedia server locally mixes these incoming data streams received by the secondary multimedia server 20 and selected by the main multimedia server 10, in order to obtain an incoming intermediate stream T which is then sent to the global mixing module 13 of the main multimedia server.

In one advantageous embodiment where the main multimedia server also has a local mixing module 17, a similar operation can also be performed in the main multimedia server during this local mixing step 130. Thus, once several incoming data streams received by the main multimedia server are selected (in the present example, streams A and B), the local mixing step 130 additionally comprises the mixing, by this local mixing module 17, of these incoming data streams received and selected by the main multimedia server in order to obtain an incoming intermediate stream which is also subsequently sent to the global mixing module 13 of the main multimedia server.

The method then continues with a step 140 in which the selected data streams are mixed globally, in particular by means of the incoming intermediate stream T, in the main multimedia server in order to obtain an aggregated stream S comprising the set of data streams selected during the selection step 120. This global mixing therefore uses all incoming intermediate streams generated locally by one of the local mixing modules of a secondary multimedia server (or of the main multimedia server when it provides such a module) when a plurality of incoming data streams can be mixed locally.

Once the aggregated stream S is obtained, the method then ends with a step 150 of outputting at least one outgoing data stream from the main multimedia server (for example the outgoing data streams A', B', C' respectively associated with the input streams A, B, C) and at least one outgoing data stream from the secondary multimedia server (for example the outgoing data streams D', E', F' respectively associated with the input streams D, E, F), these different outgoing data streams being obtained from the aggregated stream S.

This step 150 can advantageously comprise a sub-step 155 of encoding the outgoing data streams in order to convert them from an original format more appropriate for data stream mixing, to an external format more appropriate for data stream transmission as described above, which again allows further distributing the encoding effort across multiple servers.

In a first embodiment adapted for the distribution of one stream to different participants, the aggregated data stream S obtained during step 140 is directly sent as is to the secondary multimedia server in order to allow it to output, during step 150, outgoing data stream(s) (here, the streams D', E', F') comprising, or even completely corresponding to, this aggregated data stream S.

In another embodiment, the aggregated data stream S is not sent directly from the main multimedia server to the secondary multimedia server, but an outgoing intermediate stream T' is generated for each secondary multimedia server during the global mixing step 140, based on this aggregated data stream S from which the incoming intermediate stream T received from the secondary multimedia server in question is removed.

In this other embodiment, an additional sub-step 151 of local mixing is then performed during step 150, at the secondary multimedia server, in order to mix the outgoing intermediate stream T' with the incoming intermediate stream T to obtain locally the aggregated stream S. This allows even more distribution of the mixing effort across the various servers.

During this local mixing sub-step 151, it is also possible for each outgoing data stream to have the incoming data stream associated with it removed (i.e. the incoming stream A for the outgoing stream A', etc.) when the latter is one of the selected streams, which is particularly applicable to audio conferences.

Figure 3:
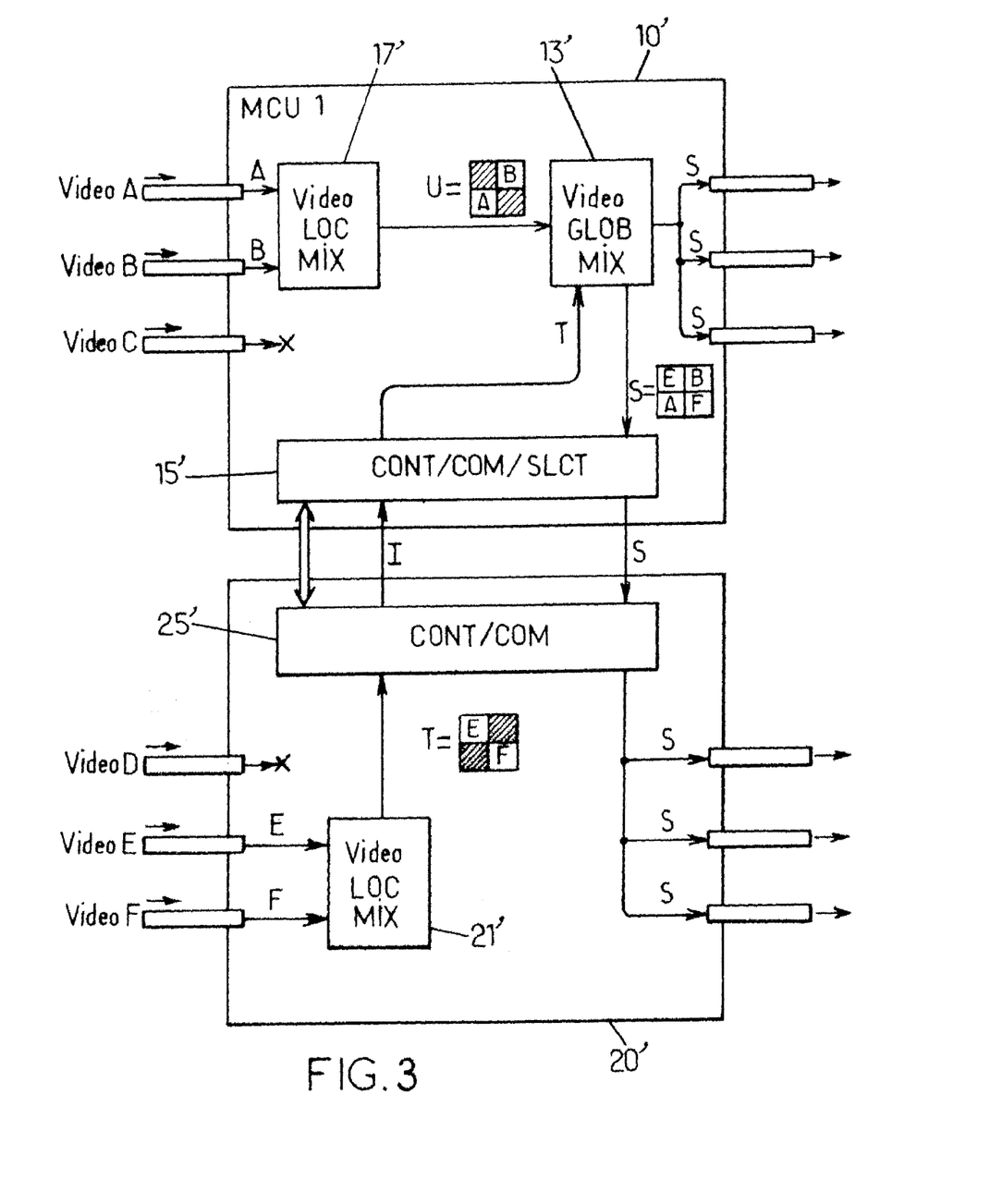
FIG. 3 illustrates a first embodiment of a device for the distributed mixing according to the invention.

We will now refer to FIG. 3, which illustrates a first embodiment of the device for distributed mixing according to the present invention.

In this first embodiment, the data streams are video streams and the mixing device is a video mixing device particularly suitable for videoconferences.

This device comprises a main multimedia server 10', similar to the main multimedia server 10 described above, as well as a secondary multimedia server 20' similar to the secondary multimedia server 20 described above.

The main multimedia server 10' thus comprises a global video mixing module 13' (similar to the global mixing module 13), a local video mixing module 17' (similar to the local mixing module 17), as well as a communication and selection module 15' which corresponds to the communication 15 and selection 11 modules previously described. As for the secondary multimedia server 20', it comprises a local video mixing module 21' as well as a communication and selection module 25', respectively similar to modules 21 and 25 described above.

The main multimedia server 10' receives three incoming video streams A, B, C on three distinct input ports respectively assigned to distinct participants, and returns three outgoing video streams A', B', C' respectively assigned to each of these participants (and therefore respectively associated with an incoming video stream) on three distinct output ports.

Similarly, the secondary multimedia server 20' receives three incoming video streams D, E, F on three distinct input ports respectively assigned to distinct participants, and returns three outgoing video streams E', D', F' respectively assigned to each of these participants (and therefore respectively associated with an incoming video stream) on three distinct output ports.

Thus, the device illustrated in FIG. 3 is capable of managing a videoconference of six participants.

In fact, the communication and selection module 25' uses a selection criterion (for example, selecting the four video streams in which the associated audio streams have the highest sound volume, or selecting four video streams based on the order in which the participants arrived in the video conference, or selecting a video stream in which the associated audio stream has a sound volume exceeding a certain threshold indicative of activity by the participant, or selecting video streams in which movement is indicated) to select four video streams among the six received and possibly decoded into a format appropriate for mixing streams. In this example, streams A, B, E and F are selected.

As each server is receiving a plurality of selected incoming video streams, the respective local mixing modules of these servers locally mix the selected incoming video streams that these servers received. In other words, module 17' mixes streams A and B to obtain an incoming intermediate stream U (where U=A+B) and module 21' mixes streams E and F to obtain an incoming intermediate stream T (where T=E+F).

The intermediate stream T is then sent by the communication module 25' to the communication and control module 15' which handles transmitting it to the global mixing module 13', which receives the intermediate stream U obtained by the local mixing module 17'.

The global mixing module 13' can then mix the various incoming streams that it receives, which in the present case are the intermediate streams T and U, to obtain an aggregated video stream S containing all the incoming streams selected (where S=T+T'=A+B+E+F).

Once the aggregated stream S is obtained, it is distributed to all the outlet ports of the multimedia servers 10' and 20'.

As for the main multimedia server 10', this distribution involves sending to each of the three output ports the respective output video streams A', B', C' containing, or completely corresponding to, the aggregated video stream S. In FIG. 3, the aggregated stream S is directly output from the three output ports of the server 10', possibly after encoding it into a format appropriate for data transmission.

As for the secondary multimedia server 20', this distribution involves transmitting the aggregated stream S from the control and communication module 15' to the control and communication module 25', before obtaining the output video streams D', E', F' to be respectively sent to the three output ports of the server 20', these video streams containing, or completely corresponding to, to the aggregated video stream S. Here again, in FIG. 3, the aggregated stream S is directly output from the three output ports of the server 20', possibly after encoding it into a format appropriate for data transmission.

In the video domain, the mixing operations mentioned above may consist of mixing the video data streams into a mosaic which simultaneously shows the selected video streams (in this case a mosaic of four images of the same size).

Thus, local mixing module 17' mixes incoming streams A, B so that they appear in opposite corners at the top right and bottom left in a mosaic of four images, and local mixing module 21' mixes incoming streams E, F so that they appear in the other opposite corners at the top left and bottom right in a mosaic of four similar images. The placement assigned to each selected incoming data stream in the mosaic can be defined beforehand by means of the control and selection module 15' of the main server and communicated to the control and command module 25' of the secondary server so that this module informs the local mixing module 21' accordingly.

With the selected incoming data streams mixed in this manner, the global mixing module 13' only needs to superimpose the intermediate streams so formed in order to obtain an aggregated stream S in which the visual presentation corresponds to a mosaic of four images corresponding to the streams A, B, E, F which can be streamed to the six participants in the videoconference.

The mosaic can be arranged in various forms using one or more selection criteria. Again using the principle of a four-image mosaic, one image can thus be reserved for a participant chosen as required to be visible due to a particular status, while the three other images can be used for real-time streaming of the images corresponding to the participants currently speaking the loudest into their microphone, for example.

We will now refer to FIG. 4, which illustrates a second embodiment of the distributed mixing device according to the invention.

In this second embodiment, the data streams are audio streams and the mixing device is an audio mixing device particularly suitable for audio conferencing. This mixing device can also be an audio/video mixing device, in which case FIG. 4 specifically illustrates the audio operation of such a device, whether during an audio-only conference for example or an audio/video conference.

Here, unlike the above embodiment concerning videoconferences, the aggregated stream S corresponding to the selected incoming data streams is not streamed directly to all the participants, but is modified in a specific manner for each participant, to prevent a participant from receiving an outgoing stream containing the incoming stream which he is sending to the device, if this stream is selected, which would cause detrimental echo phenomena.

For this purpose, this device comprises a main multimedia server 10" similar to the main multimedia server 10 described above, as well as a secondary multimedia server 20" similar to the secondary multimedia server 20 described above.

The main multimedia server 10" comprises a global audio mixing module 13" (similar to global mixing module 13), a local audio mixing module 17" (similar to local mixing module 17), as well as a communication and selection module 15" which corresponds to the communication 15 and selection 11 modules previously described. As for the secondary multimedia server 20", it comprises a local audio mixing module 21" as well as a communication and selection module 25" which are respectively similar to modules 21 and 25 described above.

Here, the local audio mixing modules 17" and 21" respectively comprise preliminary mixing means 18" and 22" which mix the incoming audio streams selected by the communication and selection module 15", in order to obtain incoming intermediate streams which can be used by the global audio mixing module 13" to obtain the aggregated stream S.

The local audio mixing modules 17" and 21" also respectively comprise second final mixing means 19" and 23'" which supply the outputted outgoing data streams based on the outgoing intermediate stream T' and certain selected incoming data streams.

Here again, the main multimedia server 10" receives three incoming audio streams A, B, C on three distinct input ports respectively assigned to distinct participants, and returns three outgoing audio streams A', B', C' respectively assigned to each of these participants (and therefore respectively associated with an incoming video stream) on three distinct output ports.

Similarly, the secondary multimedia server 20" receives three incoming audio streams D, E, F on three distinct input ports respectively assigned to distinct participants, and returns three output audio streams E',D',F' respectively assigned to each of these participants (and therefore respectively associated with an incoming video stream) on three distinct output ports.

The communication and selection module 25" uses a selection criterion, such as those mentioned above, to select four audio streams among the six received and possibly decoded into a format appropriate for mixing streams.

As an example, the secondary multimedia server can send a message containing information concerning the audio levels of the incoming audio streams D, E, F so that the communication and selection module 25", which has direct access to the audio levels of the incoming audio streams A, B, C, can select the four incoming streams having the highest audio levels, for example the streams A, B, E and F here.

This information on the audio levels can be obtained by means of a specific element which calculates the sound power level of the incoming audio streams when they are received, after decoding for example.

As each server receives a plurality of selected incoming audio streams, the respective preliminary local mixing modules of these servers locally mix the selected incoming audio streams that these servers receive. In other words, module 18" mixes streams A and B in order to obtain an incoming intermediate stream U (where U=A+B) and module 22" mixes streams E and F in order to obtain an incoming intermediate stream T (where T=E+F).

The intermediate stream T is then sent by the communication module 25" to the communication and control module 15" which handles transmitting it to the global audio mixing module 13", which receives the intermediate stream U obtained by the preliminary local mixing module 18".

The global audio mixing module 13" can then mix the various intermediate incoming streams that it receives, in this case the intermediate streams T and U, to obtain an aggregated audio stream S containing all the selected incoming streams (where S=T+T'=A+B+E+F).

Once the aggregated stream S is obtained, an intermediate outgoing stream is constructed by the global mixing module 13", for each server, by taking the aggregated video stream S and removing the intermediate stream U received from the server in question.

For the main multimedia server 10", an outgoing intermediate stream U" is constructed from the aggregated stream S from which the elements of the incoming intermediate stream U received from the preliminary local mixing module 18" are removed. In other words, the outgoing intermediate stream U" satisfies U"=S−U, meaning U"=E+F in the example in FIG. 4.

For the secondary multimedia server, an outgoing intermediate stream T" is constructed from the aggregated stream S from which the elements of the incoming intermediate stream T received from the preliminary local mixing module 22" are removed. In other words, the outgoing intermediate stream T" satisfies T"=S−T, meaning T"=A+B in the example in FIG. 4.

The respective outgoing intermediate streams are then sent to the respective final mixing modules of the servers, to be used to obtain the outgoing data streams. Outgoing intermediate stream U" is therefore sent directly to final mixing module 19" while outgoing intermediate stream T" is sent, by means of the communication and selection module 15" and the communication and control module 25", to final mixing module 23".

Final mixing module 19" then constructs the various outgoing audio streams A', B', C' to be output from the main multimedia server 10", using the outgoing intermediate stream U" and the selected incoming data streams A and B, but removing, for each output stream A', B', C', the incoming data stream associated with it.

In other words, the first outgoing audio data stream A' satisfies A'=U'+(A+B)−A, meaning A'=B+E+F in the example in FIG. 4, the second outgoing audio stream B' satisfies B'=U'+(A+B)−B, meaning B'=A+E+F in the example in FIG. 4, and the third outgoing audio stream C' satisfies C'=U'+(B+A), meaning C'=A+B+E+F=S in the example in FIG. 4.

Similarly, the final mixing module 23" constructs the various outgoing audio streams D', E', F' to be output from the secondary multimedia server 20" by using the outgoing intermediate stream T'" and the selected incoming data streams E and B, but removing, for each output data stream D', E', F', the incoming data stream associated with it.

In other words, the first outgoing audio stream D' satisfies D'=T'+(E+F), meaning D'=A+B+E+F=S in the example in FIG. 4, the second outgoing audio stream E' satisfies E'=T'+(E+F)−E, meaning E'=A+B+F in the example in FIG. 4, and the third outgoing audio stream F' satisfies F'=U'+(E+F), meaning F'=A+B+E in the example in FIG. 4.

Thus, the various outgoing audio streams contain all the selected incoming audio streams, with the possible exception of the incoming audio stream corresponding to the outgoing audio stream concerned, and this is done by means of mixing operation distributed across different mixing modules which are themselves distributed across different multimedia servers.

Of course, the invention is not limited to the example embodiments described and represented; other embodiments and other implementations can be inferred from these without exceeding the scope of the invention.

In particular, the various modules used by the present invention are indicated as being functionally separate in the figures, but may very well be integrated, within a same processor for example, in their physical implementation.

Furthermore, the relations between a main multimedia server and a single secondary multimedia server have been described in FIGS. 3 and 4 for reasons of brevity. It is obvious, however, that the invention covers the case where any number of secondary multimedia servers are connected to a same main multimedia server. The greater this number, the more distributed the operations of mixing, decoding, and encoding the data streams will be and the more effective the invention will be.

In particular, the invention allows offering a scalable system which can adapt to an increase in the number of potential participants in a teleconference. If this number changes and exceeds the capacities of a distributed mixing device according to the invention, it is sufficient to add one or more secondary multimedia server(s) to the device and to connect them to the main multimedia server in order to absorb this potential increase in the processing load, without having to replace the entire mixing device, which represents an advantage in terms of maintenance and cost.

FIGS. 3 and 4 show embodiments which process the audio streams and video streams separately. However, it is of course possible to combine the processing of the two types of streams within one distributed mixing device having a main server connected to one or more secondary server(s), these servers comprising audio mixing modules as well as video mixing modules.

The invention claimed is:

1. A device for distributed mixing of multimedia data streams, comprising a main multimedia server able to receive at least one incoming data stream and to output at least one outgoing data stream, and at least one secondary multimedia server able to receive at least one incoming data stream and to output at least one outgoing data stream, the main multimedia server comprising a selection module arranged to select a plurality of data streams from among the incoming data streams and a global mixing module arranged to mix the selected data streams in order to obtain an aggregated stream;

the secondary multimedia server comprising a local mixing module arranged to mix the incoming data streams received by the secondary multimedia server and selected by the selection module of the main multimedia server, in order to obtain an incoming intermediate stream usable by the global mixing module of the main multimedia server to obtain the aggregated stream.

2. The device according to claim 1, wherein the main and secondary multimedia servers respectively comprise a communication module arranged to transmit, from the selection module to the secondary multimedia server, a message indicating which incoming data streams received by the secondary multimedia server have been selected by the selection module, and to transmit the incoming intermediate stream from the local mixing module of the secondary multimedia server to the global mixing module of the main multimedia server.

3. The device according to claim 2, wherein the outgoing data streams comprise the aggregated stream, wherein the communication module of the main multimedia server is arranged to transmit the aggregated stream from the global mixing module of the main multimedia server to the communication module of each secondary multimedia server.

4. The device according to claim 2, wherein, for each secondary multimedia server:

the global mixing module is arranged to provide an outgoing intermediate data stream containing the aggregated stream from which the incoming intermediate data stream supplied by the secondary multimedia server is removed, the communication module of the main multimedia server is arranged to transmit the aggregated stream from the global mixing module of the main multimedia server to the communication module of the secondary multimedia server, and the local mixing module of the secondary multimedia server is arranged to obtain each outgoing data stream that is output from the secondary multimedia server by mixing the outgoing intermediate data stream with the incoming intermediate data stream.

5. The device according to claim 4, wherein each incoming data stream is associated with an outgoing data stream, wherein, for each outgoing data stream that is output from the secondary multimedia server, the local mixing module of the secondary multimedia server is arranged to remove from said outgoing data stream the incoming data stream associated with it.

6. The device according to claim 1, wherein the main multimedia server additionally comprises a local mixing module arranged to mix at least two incoming data streams received by the main multimedia server once said incoming data streams are selected by the selection module.

7. The device according to claim 1, wherein each local mixing module is additionally arranged to decode the incoming data streams and to encode the outgoing data streams.

8. A method for distributed mixing of multimedia data streams, implemented by a distributed mixing device comprising a main multimedia server and at least one secondary multimedia server, the method comprising the steps consisting of:

receiving at least one incoming data stream in the main multimedia server and at least one incoming data stream in the secondary multimedia server;

selecting, in the main multimedia server, a plurality of data streams from among the incoming data streams;

once several incoming data streams received by the secondary multimedia server are selected, mixing said incoming data streams received by the secondary multimedia server and selected in the secondary multimedia server, in order to obtain an incoming intermediate data stream, mixing the selected data streams, by means of the incoming intermediate data stream, in the main multimedia server in order to obtain an aggregated stream; and outputting at least a first outgoing data stream from the main multimedia server and at least a second outgoing data stream from the secondary multimedia server, said outgoing data streams being obtained from the aggregated stream.

9. The method according to claim 8, additionally comprising the steps consisting of for each secondary multimedia server:

obtaining an outgoing intermediate data stream containing the aggregated stream from which the incoming intermediate data stream supplied by the secondary multimedia server is removed, sending said outgoing intermediate data stream from the main multimedia server to the secondary multimedia server, and obtaining each outgoing data stream that is output from the secondary multimedia server by mixing the outgoing intermediate data stream with the incoming intermediate data stream.

10. The method according to claim 9, wherein each incoming data stream is associated with an outgoing data stream, wherein, for each outgoing data stream that is output from the secondary multimedia server, the incoming data stream associated with the outgoing data stream is removed from said outgoing data stream.

11. The method according to claim 8, wherein the step of receiving incoming data streams includes the decoding of said incoming data streams, and the step of outputting outgoing data streams includes the encoding of said outgoing data streams.

12. The method according to claim 8, wherein the mixing device is a device for mixing video data streams and the incoming and outgoing data streams are video data streams.

13. The method according to claim 8, wherein the mixing device is a device for mixing audio data streams and the incoming and outgoing data streams are audio data streams.

14. The method according to claim 13, wherein the selection of incoming data streams includes the selection of a predefined number of incoming data streams having the highest audio level among the set of incoming data streams.

15. The method according to claim 8, wherein the selection of incoming data streams includes the selection of a predetermined incoming data stream.

16. The device according to claim 1, wherein the mixing device is a device for mixing video data streams and the incoming and outgoing data streams are video data streams.

17. The device according to claim 1, wherein the mixing device is a device for mixing audio data streams and the incoming and outgoing data streams are audio data streams.

18. The device according to claim 17, wherein the selection of incoming data streams includes the selection of a predefined number of incoming data streams having the highest audio level among the set of incoming data streams.

19. The device according to claim 1, wherein the selection of incoming data streams includes the selection of a predetermined incoming data stream.

\* \* \* \* \*